United States Patent
Bao et al.

(10) Patent No.: US 9,426,622 B2
(45) Date of Patent: Aug. 23, 2016

(54) DETERMINATION OF A LOCATION OF A DEVICE BASED ON INFORMATION THAT IDENTIFIES LOCATIONS OF OTHER DEVICES

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Penngrove, CA (US); Kevin Flores, San Jose, CA (US); Tushar Chaudhary, Mountain View, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/578,672

(22) Filed: Dec. 22, 2014

(65) Prior Publication Data
US 2016/0183053 A1 Jun. 23, 2016

(51) Int. Cl.
*H04W 4/02* (2009.01)

(52) U.S. Cl.
CPC ..................... *H04W 4/023* (2013.01)

(58) Field of Classification Search
CPC ..................................................... H04W 4/023
See application file for complete search history.

(56) References Cited

U.S. PATENT DOCUMENTS

| | | | | |
|---|---|---|---|---|
| 8,417,264 | B1 * | 4/2013 | Whitney | H04W 64/00 455/456.1 |
| 2007/0105498 | A1 * | 5/2007 | Steudle | H04M 1/6066 455/41.2 |
| 2010/0265140 | A1 * | 10/2010 | Sohn | G01S 5/0072 342/451 |
| 2011/0159862 | A1 * | 6/2011 | Jackson | G01S 5/02 455/418 |
| 2011/0312345 | A1 * | 12/2011 | Nam | H04W 64/00 455/456.2 |
| 2012/0244884 | A1 * | 9/2012 | Lim | H04W 4/023 455/456.2 |
| 2012/0316963 | A1 * | 12/2012 | Moshfeghi | G06Q 20/20 705/14.58 |
| 2015/0005014 | A1 * | 1/2015 | Huang | G01S 5/0263 455/456.5 |
| 2015/0087328 | A1 * | 3/2015 | Chao | H04W 64/00 455/456.1 |
| 2015/0237471 | A1 * | 8/2015 | Li | H04W 4/021 455/456.2 |

* cited by examiner

*Primary Examiner* — Nathan Mitchell

(57) ABSTRACT

A device may receive an indication that a first device, a second device, and a third device are within communication range of a target device. The first device may be outside of communication range of a positioning system that provides information for determining a location. The target device may be outside of communication range of the positioning system and outside of communication range of three or more devices which are within communication range of the positioning system. The device may receive information that identifies a first location associated with the first device, a second location associated with the second device, and a third location associated with the third device. The device may determine a target device location based on the information that identifies the first location, the second location, and the third location. The device may provide or store information that identifies the target device location.

20 Claims, 8 Drawing Sheets

DETERMINATION OF A LOCATION OF A DEVICE BASED ON INFORMATION THAT IDENTIFIES LOCATIONS OF OTHER DEVICES

BACKGROUND

Location-based services are a general class of services that use the geographical position of a device to control some features of the device. A device, such as a mobile device, may use location-based services in conjunction with a mobile network. Location-based services have a number of uses in mapping, social networking, entertainment, work, personal health, etc. Location-based services are becoming more important as the smart phone and tablet computer markets expand.

DETAILED DESCRIPTION OF PREFERRED EMBODIMENTS

The following detailed description of example implementations refers to the accompanying drawings. The same reference numbers in different drawings may identify the same or similar elements.

A device, such as a mobile device, may be taken to a particular location without being pre-programmed with information that identifies the particular location. The device's location may be useful for location-based services in a number of contexts, such as a social networking context, an emergency context (e.g., 911 services), a commercial context, or the like. The device may use a positioning system, such as a global positioning system (GPS), to determine the device's location. However, a GPS signal may be unavailable for determining the device's location in a particular location, such as an indoor location, a basement location, an urban location with many obstacles, or the like. Implementations described herein may facilitate determining the device's location based on information that identifies the locations of other devices within communication range of the device.

Figure 1A:
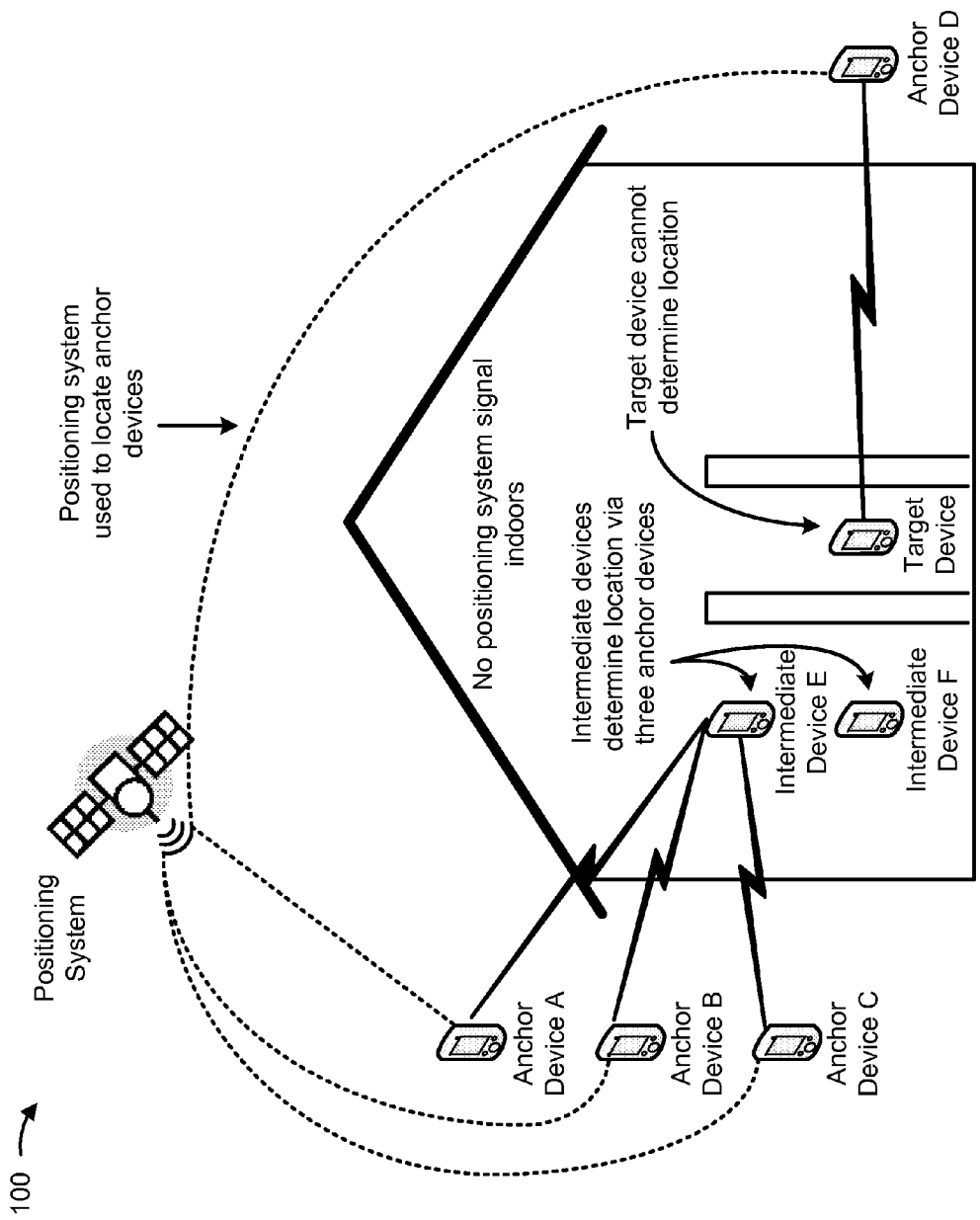
FIGS. 1A and 1B are diagrams of an overview of an example implementation described herein.
Figure 1B:
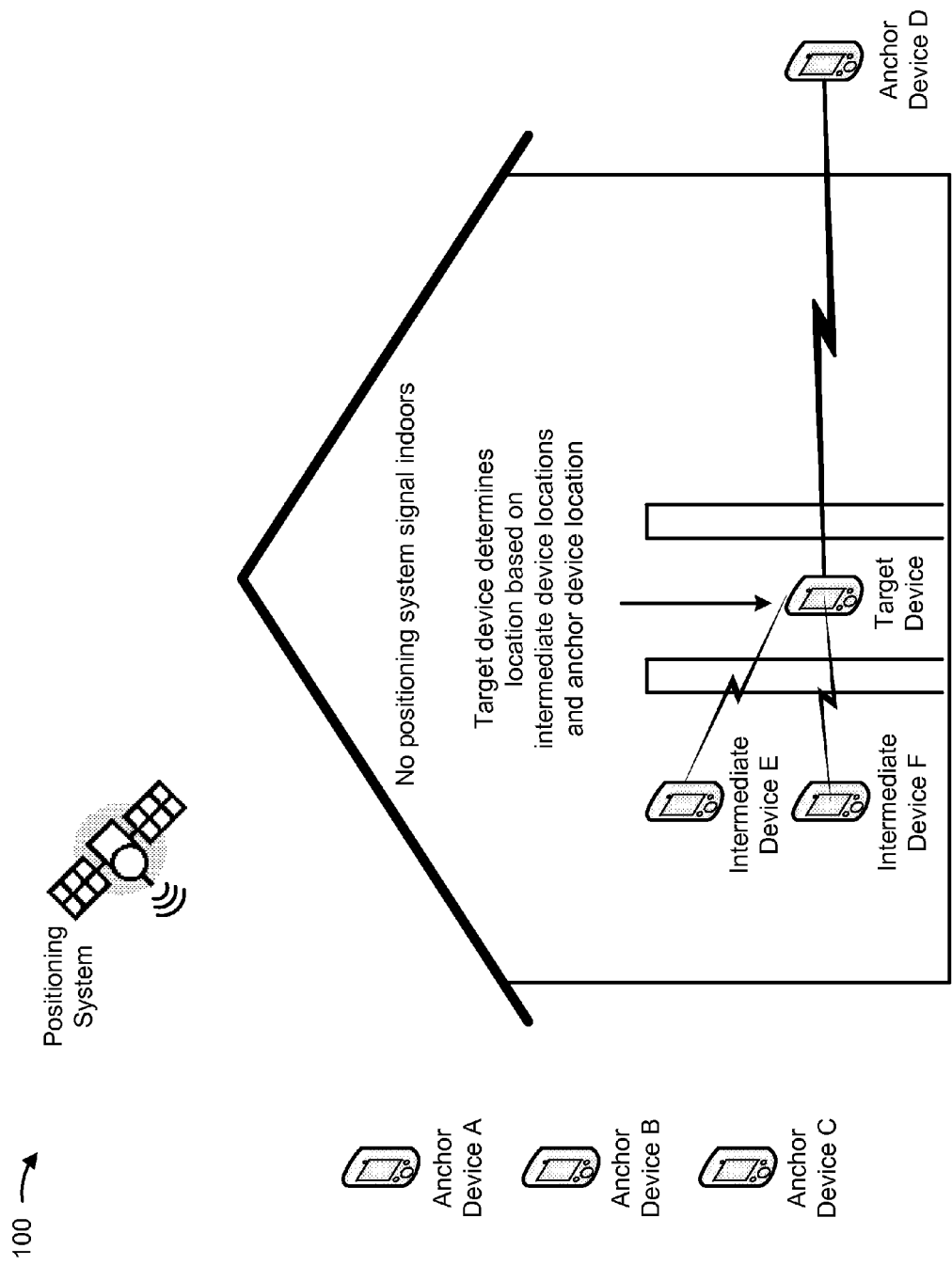

FIGS. 1A and 1B are diagrams of an overview of an example implementation 100 described herein. Assume that example implementation 100 includes a positioning system (e.g., a global positioning system (GPS)); four anchor devices (e.g., a device that is within communication range of the positioning system and possesses information that identifies the anchor device's own location), shown as anchor device A, B, C, and D; two intermediate devices (e.g., a device that is not within communication range of the positioning system but is within communication range of three or more anchor devices), shown as intermediate devices E and F; and a target device (e.g., a device that is not within communication range of the positioning system and is within communication range of two or fewer anchor devices). Assume further that the anchor devices, the intermediate devices, and/or the target device can communicate via a network (e.g., a local area network (LAN), a long term evolution (LTE) network, etc.).

In example implementation 100, assume that anchor devices A, B, C, and D are within communication range of the positioning system and possess information that identifies the locations of anchor devices A, B, C, and D. Further, assume that intermediate device E is within communication range of anchor devices A, B, and C, and assume that intermediate device F is within communication range of anchor devices A, B, and C. Further, assume that intermediate devices E and F are also each within communication range of the target device. Finally, assume that the target device is also within communication range of anchor device D.

As shown in FIG. 1A, anchor devices A, B, C, and D may determine anchor device locations using information from the positioning system. Intermediate devices E and F may each receive an indication that anchor devices A, B, and C are within communication range. Intermediate devices E and F may each receive, from anchor devices A, B, and C, information that identifies anchor device locations of anchor device A, B, and C. Intermediate devices E and F may each determine a confidence level associated with a location of anchor device A, a confidence level associated with a location of anchor device B, and a confidence level associated with a location of anchor device C. The confidence levels may indicate a confidence in the accuracy of the anchor device locations. Based on the anchor device locations and/or the confidence levels associated with the anchor device locations, intermediate device E may determine an intermediate device location of intermediate device E and intermediate device F may determine an intermediate device location of intermediate device F. Intermediate devices E and F may each store information that identifies the intermediate device locations, and/or may provide the information that identifies the intermediate device locations.

As shown in FIG. 1B, the target device may receive an indication, from intermediate devices E and F and anchor device D, indicating that intermediate devices E and F and anchor device D are within communication range of the target device. The target device may receive information that identifies locations of intermediate devices E and F, and a location of anchor device D. The target device may determine confidence levels associated with the locations of intermediate devices E and F, and the location of anchor device D. The confidence levels may indicate a confidence in the accuracy of the locations of intermediate devices E and F, and the location of anchor device D. A confidence level associated with anchor device D's location may be higher than confidence levels associated with intermediate devices E and F's locations because anchor device D's location is determined directly from information from the positioning system, while intermediate devices E and F's locations are determined indirectly from information from the positioning system.

Based on the information that identifies the locations of intermediate devices E and F and anchor device D and/or based on the confidence levels associated with the locations, the target device may determine the target device's location. The target device may store the information that identifies the target device's location and/or may provide the information that identifies the target device's location. In this way, a target device which lacks direct access to a positioning system signal may determine the target device's location based on the locations of other devices within communication range, and/or based on the confidence levels associated with the locations of other devices within communication range. The target device's location may be used to determine the location of other target devices or used in location based services in a number of contexts, such as a social networking context, an emergency context, a commercial context, or the like.

Figure 2:
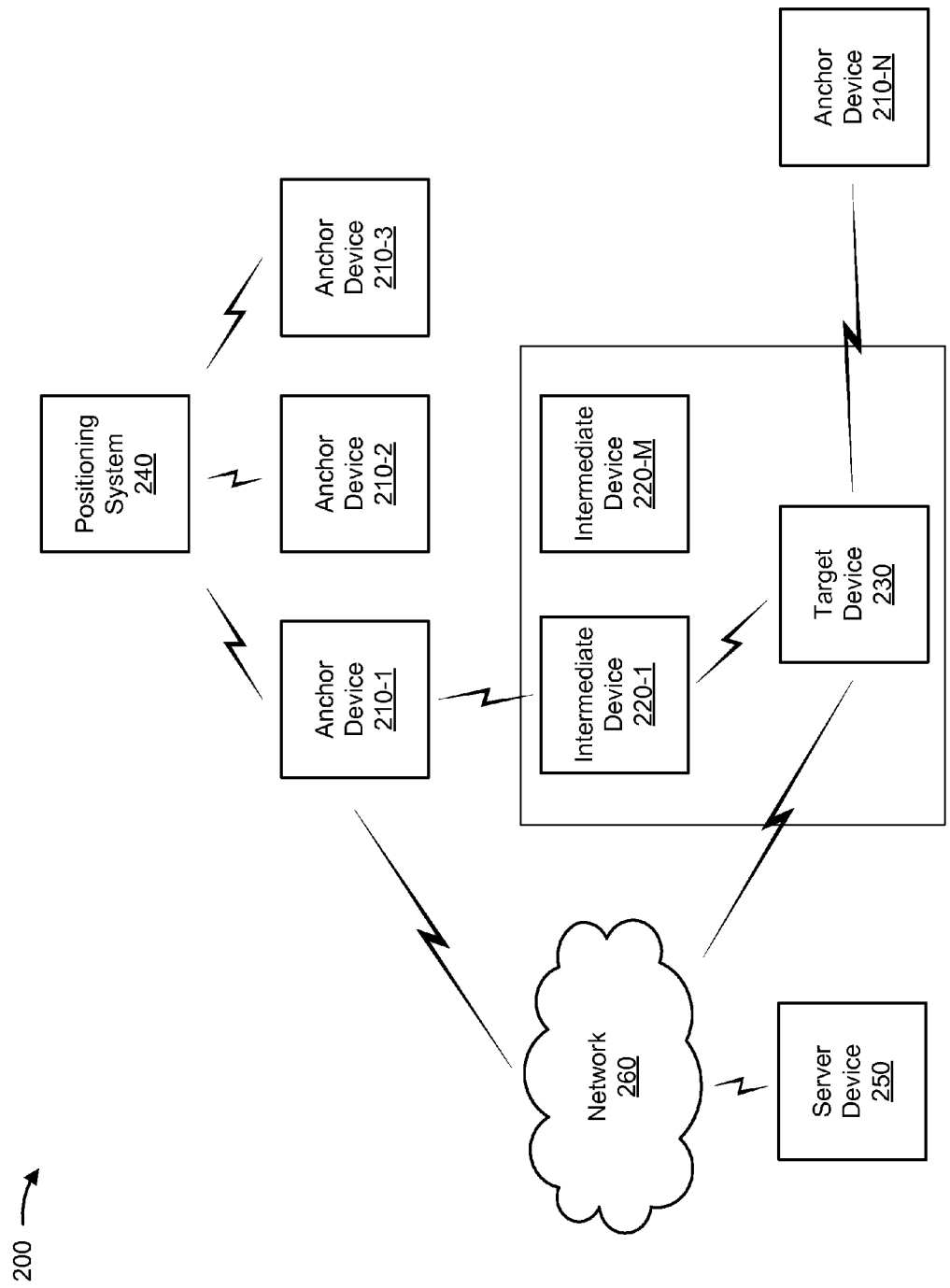
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more anchor devices 210-1 through 210-N (N≥1) (hereinafter referred to collectively as "anchor devices 210," and individually as "anchor device 210"), one or more intermediate devices 220-1 through 220-M (M≥1) (hereinafter referred to collectively as "intermediate devices 220," and individually as "intermediate device 220"), a target device 230, a positioning system 240, a server device 250, and a network 260. Devices of environment 200 may interconnect via wired connections, wireless connections, or a combination of wired and wireless connections.

Anchor device 210 may include one or more devices capable of receiving, generating, processing, storing, and/or providing information associated with a location of anchor device 210 (e.g., an anchor device location). For example, anchor device 210 may include a mobile phone (e.g., a smart phone), a base station, an access point, a radiotelephone, a video phone, a computer (e.g., a desktop computer, a laptop computer, a tablet computer, etc.), a video game console, a set-top box, or a similar type of device. In some implementations, anchor device 210 may include a device that is within communication range of positioning system 240. In some implementations, anchor device 210 may receive, from positioning system 240, information used to identify the anchor device location.

Intermediate device 220 may include one or more devices capable of receiving, generating, processing, storing, and/or providing information associated with a location of intermediate device 220 (e.g., an intermediate device location). For example, intermediate device 220 may include a mobile phone (e.g., a smart phone), a base station, an access point, a radiotelephone, a video phone, a computer (e.g., a desktop computer, a laptop computer, a tablet computer, etc.), a video game console, a set-top box, or a similar type of device. In some implementations, intermediate device 220 may include a device that is not within communication range of positioning system 240. Additionally, or alternatively, intermediate device 220 may include a device that is within communication range of three or more anchor devices 210. In some implementations, intermediate device 220 may receive, from three or more anchor devices 210, information used to identify the intermediate device location.

Target device 230 may include one or more devices capable of receiving, generating, processing, storing, and/or providing information associated with a location of target device 230 (e.g., a target device location). For example, target device 230 may include a mobile phone (e.g., a smart phone), a base station, an access point, a radiotelephone, a video phone, a computer (e.g., a desktop computer, a laptop computer, a tablet computer, etc.), a video game console, a set-top box, or a similar type of device. In some implementations, target device 230 may include a device that is not within communication range of positioning system 240 and that is not within communication range of three or more anchor devices 210. For example, target device 230 may include a device that is within communication range of one or more intermediate devices 220 and/or two or fewer anchor devices 210. Although only one target device 230 is shown in environment 200, there may be more than one target device 230 in some implementations. In some implementations, target device 230 may receive, from one or more intermediate devices 220 and/or two or fewer anchor devices 210, information used to identify the target device location.

Positioning system 240 may include one or more devices capable of receiving, generating, processing, storing, and/or providing information associated with a location of a device (e.g., a device location). For example, positioning system 240 may include a GPS (e.g., a satellite-based GPS, a terrestrial-based GPS, etc.), a set of cell towers, or a similar type of device. Positioning system 240 may generate and/or provide, to anchor device 210, information used to identify the anchor device location.

Server device 250 may include one or more devices capable of receiving, generating, processing, storing, and/or providing information associated with a device location. For example, server device 250 may include a network server device, a computer, a router, a switch, or the like. In some implementations, server device 250 may coordinate and/or carry out the receiving, generating, processing, storing, and/or providing of information concerning device locations of anchor device 210, intermediate device 220, and/or target device 230.

Network 260 may include one or more wired and/or wireless networks. For example, network 260 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), a near field communication (NFC) network, a Bluetooth network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
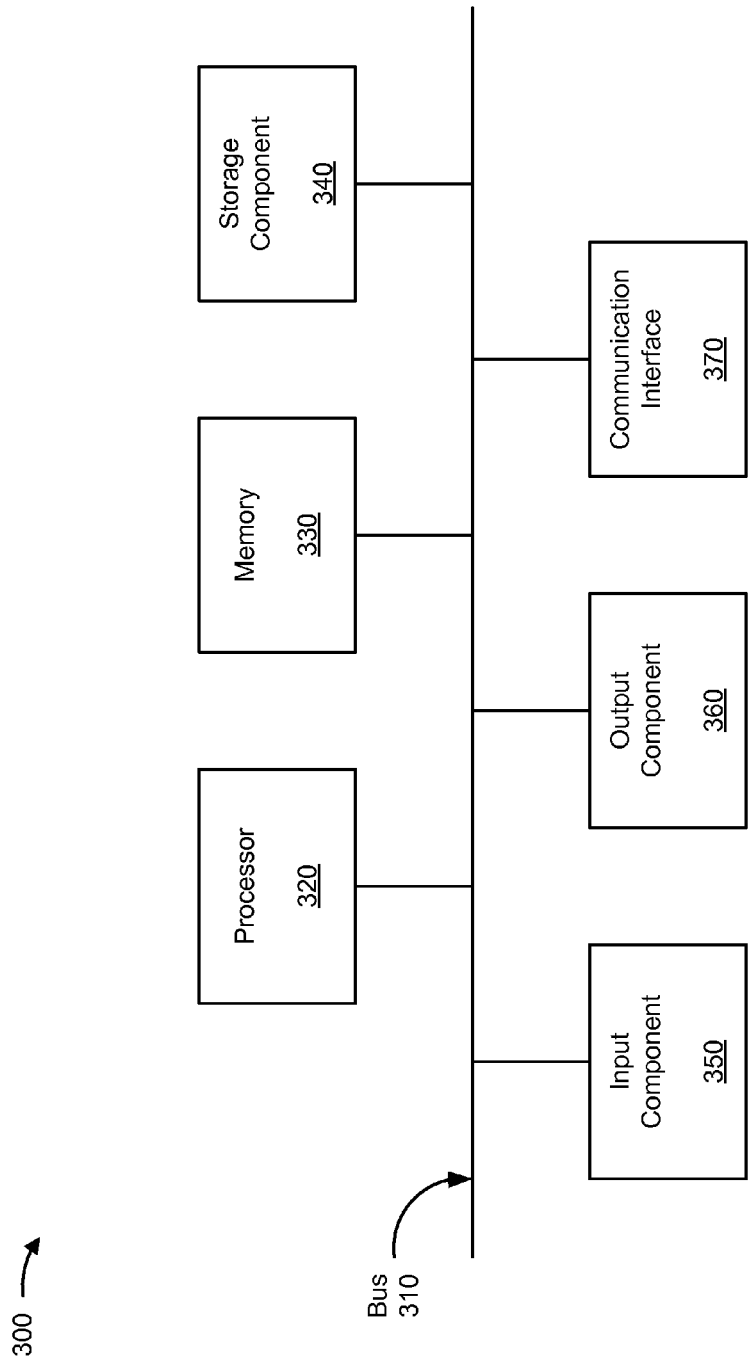
FIG. 3 is a diagram of example components of one or more devices of FIG. 2.

FIG. 3 is a diagram of example components of a device 300. Device 300 may correspond to anchor device 210, intermediate device 220, target device 230, positioning system 240, and/or server device 250. In some implementations, anchor device 210, intermediate device 220, target device 230, positioning system 240, and/or server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
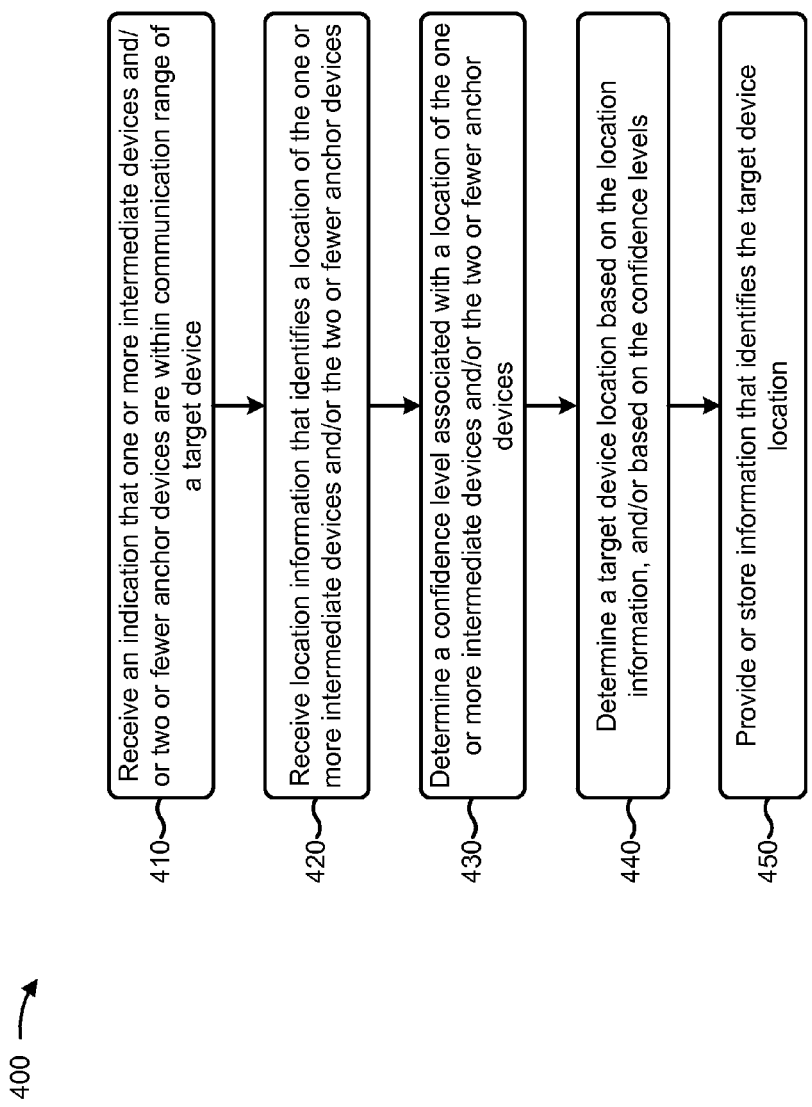
FIG. 4 is a flow chart of an example process for determining a location of a device based on locations of other devices.

FIG. 4 is a flow chart of an example process 400 for determining a location of a device based on locations of other devices. In some implementations, one or more process blocks of FIG. 4 may be performed by server device 250. Additionally, or alternatively, one or more process blocks of FIG. 4 may be performed by another device or a group of devices separate from or including server device 250, such as anchor device 210, intermediate device 220, target device 230, and/or positioning system 240. For example, target device 230 may perform one or more process blocks of process 400, in some implementations.

As shown in FIG. 4, process 400 may include receiving an indication that one or more intermediate devices and/or two or fewer anchor devices are within communication range of a target device (block 410). For example, server device 250 may receive an indication that one or more intermediate devices are broadcasting a location tag. Additionally, or alternatively, server device 250 may receive an indication that two or fewer anchor devices are broadcasting a location tag. The location tag may include a device identifier that identifies the device broadcasting the location tag. Additionally, or alternatively the location tag may include an indication that the device possesses device location information. Anchor device 210 may be within communication range of positioning system 240 and may determine an anchor device location based on a communication with positioning system 240. Intermediate device 220 may determine an intermediate device location based on information received from three or more other devices (e.g., anchor devices 210). Server device 250 may set up a connection between target device 230 and the one or more intermediate devices 220 and/or between target device 230 and the two or fewer anchor devices 210. Additionally, or alternatively, target device 230 may provide an indication to server device 250 indicating the devices within communication range of target device 230.

In the above-mentioned implementations, there are two or fewer anchor devices 210 because if there were three or more anchor devices 210, target device 230 would have the status of an intermediate device 220, which is a separate implementation. Implementations with many different combinations of devices are included in the phrase "one or more intermediate devices 220 and/or two or fewer anchor devices 210." For example, three intermediate devices 220 may be within communication range of target device 230. Additionally, or alternatively, two intermediate devices 220 and one anchor device 210 may be within communication range of target device 230. Additionally, or alternatively, one intermediate device 220 and two anchor devices 210 may be within communication range of target device 230. Additionally, or alternatively, four or five intermediate devices 220 may be within communication range of target device 230. The confidence level of the target device location of target device 230 may be higher when there are more anchor devices 210 within communication range of target device 230, and may be lower when there are fewer anchor devices 210 within communication range of target device 230.

In some implementations, one or more first target devices 230 and/or zero or more intermediate devices 220 may be within communication range of a second target device 230. The location of the second target device 230 may be determined using the locations of three or more first target devices 230 and/or zero or more intermediate devices 220. Additionally, or alternatively, the location of a set of third target devices 230 may be determined using the locations of three or more second target devices 230. This process can go on in a chain of target devices 230.

In some implementations, server device 250 may receive an indication of another device being within communication range of target device 230 based on a condition being satisfied. For example, server device 250 may receive an indication from intermediate device 220 if a user of intermediate device 220 has given permission to communicate with other devices. Additionally, or alternatively, server device 250 may receive an indication from intermediate device 220 if intermediate device 220 has a high confidence level associated with the intermediate device location (e.g., satisfies a threshold). Additionally, or alternatively, server device 250 may receive an indication from intermediate device 220 if target device 230 has communicated with intermediate device 220 in that geographical location or another geographical location in the past.

As further shown in FIG. 4, process 400 may include receiving location information that identifies a location of the one or more intermediate devices and/or the two or fewer anchor devices (block 420). For example, server device 250 may receive the location information (e.g., corresponding to an intermediate device location and/or an anchor device location, etc.). As an example, the location information may identify a geographic location, one or more location coordinates, or the like. Additionally, or alternatively, target device 230 may collect the location information and may broadcast the location information to server device 250.

In some implementations, server device 250 may receive the location information in a synchronized fashion in order to increase energy efficiency in anchor devices 210, intermediate devices 220, and/or target devices 230. For example, anchor device 210, intermediate device 220, and/or target device 230 may sleep (e.g., in a low power mode) and may wake up (e.g., in a high power mode) based on a synchronized schedule, such as every 20 seconds, every 30 seconds, every minute, or the like. During synchronization, anchor device 210, intermediate device 220, and/or target device 230 may provide and/or receive packets of information to communicate with one another and/or with server device 250 when in the high power mode. During synchronization, anchor device 210, intermediate device 220, and/or target device 230 may be engaged in a process involving updating one another and/or server device 250 regarding their locations every specified time period, such as every 20 seconds, every 30 seconds, every minute, or the like. In some implementations, the synchronization may occur on a network (e.g., network 260) which operates on a licensed band, such as an LTE network or another type of cellular network. A licensed band may allow better coordination between devices by allaying some concerns about user privacy. In some implementations, an LTE Direct network may be used for the synchronization because an LTE Direct network has a long range that is approximately 500 meters. Additionally, or alternatively, the synchronization may occur on another type of network (e.g., a WLAN, such as a WiFi network)

As further shown in FIG. 4, process 400 may include determining a confidence level associated with a location of the one or more intermediate devices and/or the two or fewer anchor devices (block 430). For example, server device 250 may determine a confidence level associated with one or more intermediate device locations and/or one or more anchor device locations. Additionally, or alternatively, target device 230 may determine the confidence levels, and may provide the confidence levels to server device 250.

In some implementations, the confidence level associated with the anchor device locations may be high (e.g., relative to intermediate device locations and target device locations) because the anchor device locations are based on a signal directly from positioning system 240. In contrast, the confidence level associated with the intermediate device locations may be medium (e.g., lower than anchor device locations but higher than target device locations) because the intermediate device locations are based on receiving information from three or more anchor device locations, and thus, indirectly from positioning system 240. Similarly, the confidence level associated with the target device locations may be low (e.g., relative to the anchor device locations and the intermediate device locations) because the target device locations are based on the intermediate device locations and/or the anchor device locations.

In some implementations, the confidence level may be represented using a string (e.g., "anchor device," "intermediate device," "low," "medium," "high," etc.), a number (e.g., 55%, 0.55, etc.), a combination of a string and a number (e.g., "anchor device 55%," "intermediate device based on 6 anchor devices at 55%," etc.), or the like.

The confidence level may be determined based on a quantity of devices from which location information is received. For example, an intermediate device location determined from five anchor device locations may have a higher confidence level than an intermediate device location determined from three anchor device locations. Additionally, or alternatively, the confidence level may be determined based on a distance to the devices from which location information is received. For example, the confidence level of a target device 230 which is 100 meters away from three intermediate devices 220 will be higher than the confidence level of a target device 230 which is 200 meters away from three intermediate devices 220. Additionally, or alternatively, the confidence level may be determined based on an amount of time that has elapsed since a last communication with the devices from which location information is received (e.g., a target device 230 which has more recently communicated with intermediate devices 220 may have a higher confidence level). Additionally or alternatively, the confidence level may be determined based on a speed and/or direction of the movement of the devices from which location information is received.

In some implementations, anchor devices 210, intermediate devices 220, and/or target devices 230 may change location and/or change the confidence level associated with a location. For example, target device 230 may move closer to anchor devices 210 and may enter communication range of three or more anchor devices 210. In this case, there may be a change in the information that identifies target device location, and/or the confidence level associated with the target device location. The confidence level may increase because target device 230 now has the status of intermediate device 220, since target device 230 is now in communication with three or more anchor devices 210.

As further shown in FIG. 4, process 400 may include determining a target device location based on the location information and/or based on the confidence levels (block 440). For example, server device 250 may determine the target device location based on the location information and/or based on the confidence levels associated with the intermediate device locations and/or the anchor device locations. In some implementations, server device 250 may determine a relative position of target device 230 in relation to the intermediate device location(s) and/or in relation to the anchor device location(s). Server device 250 may determine the target device location based on an algorithm that incorporates the relative positions, the location information, and/or the confidence levels. Additionally, or alternatively, target device 230 may determine the target device location, and may provide information relating to the target device location to server device 250.

In some implementations, the confidence levels of the devices providing location information may be used as weighting factors. For example, the location of an anchor device 210 with a high confidence level may be assigned a higher weight determining the target device location than the location of an intermediate device 220 with a low confidence level.

In some implementations, server device 250 may determine the target device location based on a received signal strength (RSS) by measuring physical waveforms of packets sent between target device 230 and intermediate devices 220 and/or between target device 230 and anchor device 210. Measuring the physical waveforms of the packets may involve analyzing characteristics of electromagnetic waves moving between devices. Additionally, or alternatively, server device 250 may use the RSS by measuring the physical waveforms of the packets sent between target device 230 and some other part of network 260. Additionally, or alternatively, server device 250 may use the RSS by measuring the physical waveforms of the packets sent between intermediate device 220 and some other part of network 260, and/or anchor device 210 and some other part of network 260.

In some implementations, server device 250 may determine the target device location based on triangulation, multi-angulation, trilateration, multi-lateration, or the like. Triangulation of the target device location may require information identifying a location of at least three other devices, such as intermediate device 220 and/or anchor device 210. Additionally, or alternatively, server device 250 may determine the target device location based on a least square algorithm, a maximum likelihood algorithm, or the like. The algorithm used may be an algorithm that may depend upon whether intermediate device 220 and/or anchor device 210 are located in a city setting, an open field setting, inside a building, or the like. Additionally, or alternatively, the algorithm used may depend upon the type of network 260, such as whether network 260 is an LTE network, a 3G network, or the like. Additionally, or alternatively, the algorithm used may depend upon the type of anchor device 210, the type of intermediate device 220, the type of target device 230, the type of positioning system 240, the type of server device 250, or the like. For example, the algorithm may depend upon whether intermediate device 220 is a mobile device or a stationary device.

As further shown in FIG. 4, process 400 may include providing or storing information that identifies the target device location (block 450). For example, server device 250 may provide information that identifies the target device location to target device 230, to another target device 230, to intermediate device 220, to anchor device 210, to positioning system 240, or the like. Additionally, or alternatively, server device 250 may store information that identifies the target device location. Target device 230's location may be used to determine the location of other target devices 230 or may be used in location based services in a number of contexts, such as a social networking context, an emergency context, a commercial context, or the like.

In some implementations, target device 230 may receive information using a "pull" approach, without server device 250 acting as a coordinator. A pull approach may include target device 230 extracting, requesting, and/or retrieving information from the one or more intermediate devices 220, the two or fewer anchor devices 210, and/or server device 250.

Additionally, or alternatively, the one or more intermediate devices 220 and/or the two or fewer anchor devices 210 may provide information to target device 230 using a "push" approach, without server device 250 acting as a coordinator. A push approach may include the one or more intermediate devices 220, the two or fewer anchor devices 210, and/or server device 250 sending or broadcasting information to target device 230 and/or server device 250.

Additionally, or alternatively, target device 230 may determine target device location and provide it to other target devices 230, without server 250 acting as a coordinator. Additionally, or alternatively, target devices 230 may extract or collect target device location from another target device 230, without server 250 acting as a coordinator.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
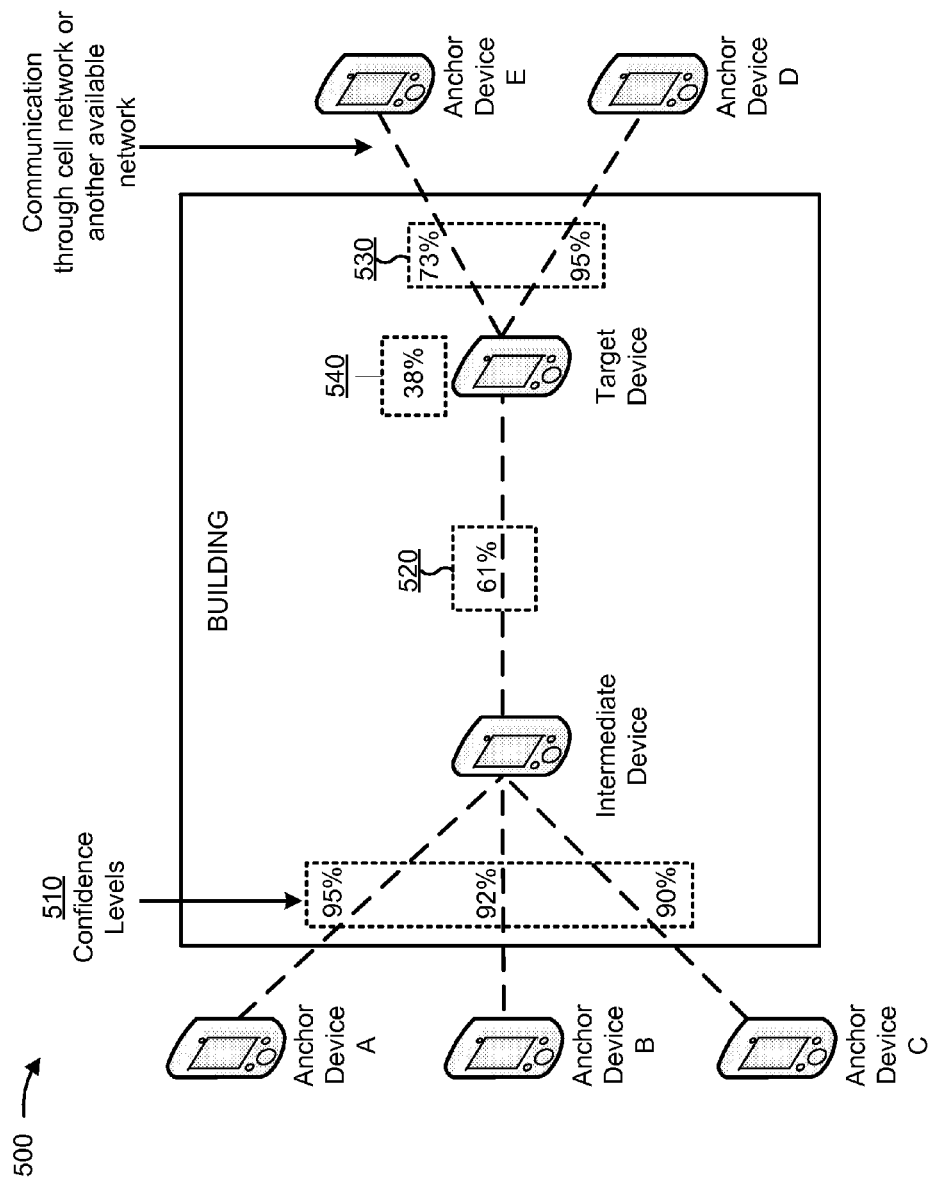
FIGS. 5-7 are diagrams of example implementations relating to the example process shown in FIG. 4.

FIG. 5 is a diagram of an example implementation 500 relating to example process 400 shown in FIG. 4. FIG. 5 shows an example of determining a location of a device based on locations of other devices.

As shown in FIG. 5, assume that example implementation 500 includes a target device, an intermediate device, and anchor devices A, B, C, D, and E. Assume further that anchor devices A, B, C, D, and E are within communication range of positioning system 240 and each possess information that identifies an anchor device location of a corresponding anchor device. As further shown in FIG. 5, assume that anchor devices A, B, and C are located outside of a building and within communication range of the intermediate device, which is located inside of the building. As further shown in FIG. 5, assume that anchor devices D and E are located outside of the building and within communication range of the target device. As further shown in FIG. 5, assume that the intermediate device is also within communication range of the target device, which is located inside of the building.

Assume that the intermediate device receives an indication that anchor devices A, B, and C are within communication range of the intermediate device. The intermediate device may receive information that identifies the anchor device locations of anchor devices A, B, and C. The intermediate device may determine a confidence level associated with each anchor device location. As shown by reference number 510, assume that the confidence level of anchor device A's location is 95%, the confidence level of anchor device B's location is 92%, and the confidence level of anchor device C's location is 90%. The intermediate device may determine an intermediate device location corresponding to the intermediate device based on the anchor device locations and/or based on the confidence level associated with each anchor device location.

Assume that the target device receives an indication that the intermediate device is within communication range of the target device. The target device may receive information that identifies the intermediate device location from the intermediate device. The target device may determine the confidence level associated with the intermediate device location. As shown by reference number 520, assume that the confidence level of the intermediate device's location is 61%. The confidence level is lower than the confidence level of the anchor device locations because the information used to determine the intermediate device location does not come directly from positioning system 240.

Assume that the target device receives an indication that anchor devices D and E are within communication range of the target device. The target device may receive information that identifies the anchor device locations of anchor devices D and E. The target device may determine the confidence level associated with each anchor device location. As shown by reference number 530, assume that the confidence level of anchor device D's location is 95% and the confidence level of anchor device E's location is 73%.

As shown, the target device may determine the target device location based on the information that identifies the anchor device locations, the information that identifies the intermediate device location, and/or the confidence levels associated with the anchor device locations and the intermediate device location. The target device may provide and/or store the information that identifies the target device location. As shown by reference number 540, assume that the confidence level associated with the target device location is 38%.

The target device location and the confidence level associated with the target device location may be used for location based services, such as a mapping service, a gaming service, or the like. The type of location based services that can be used may depend upon whether the confidence level associated with the target device location satisfies a threshold. For example, if the confidence level associated with the target device location is greater than a first threshold (e.g., 35%), the target device location may be used for a gaming service (e.g., a game that uses target device locations from participating devices). In some implementations, if the confidence level is greater than a second threshold (e.g., 65%), the target device location may be used for a second service, such as an advertising service that provides advertisements based on the target device location.

As indicated above, FIG. 5 is provided merely as an example. Other examples are possible and may differ from what was described with regard to FIG. 5.

Figure 6:
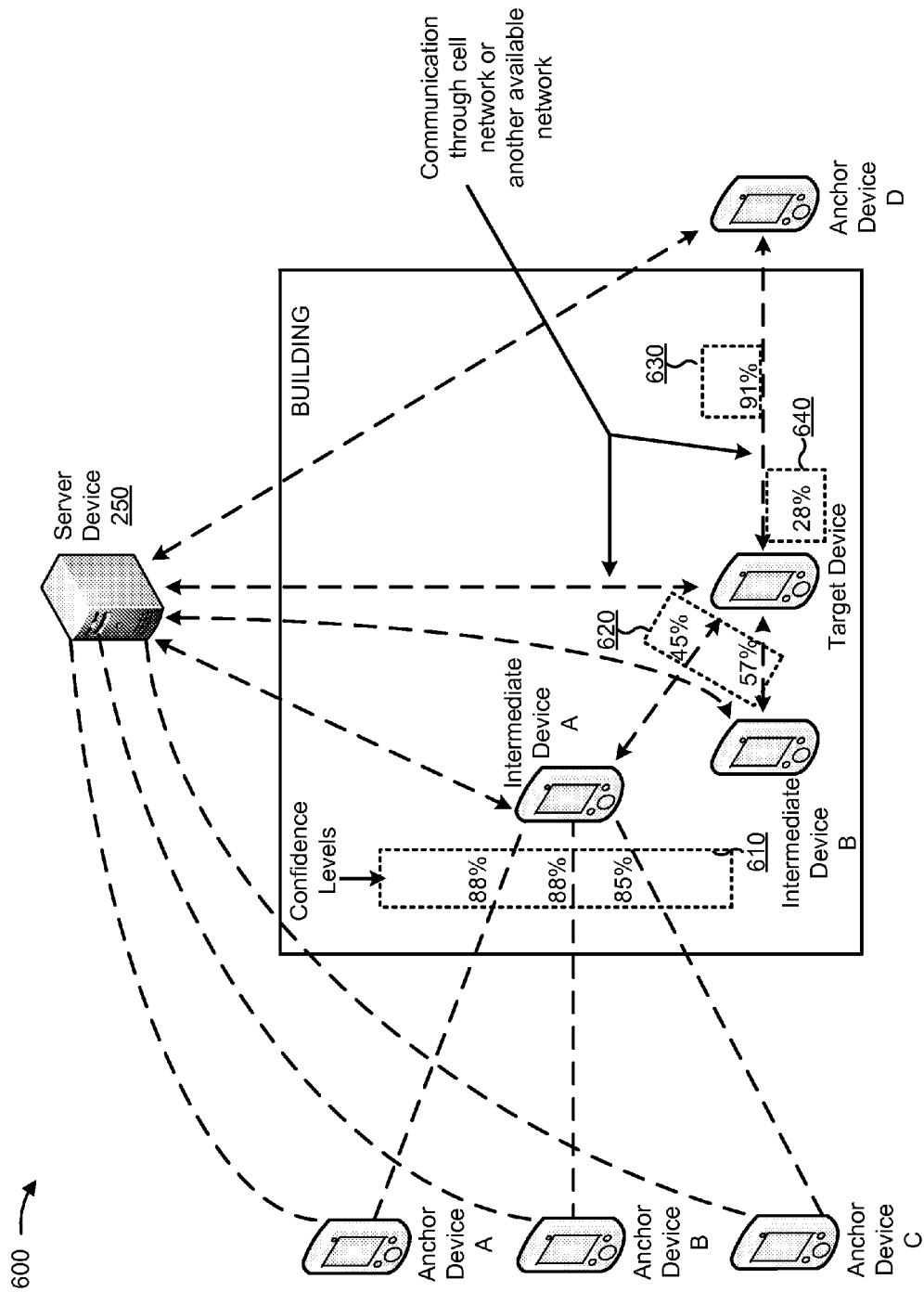

FIG. 6 is a diagram of an example implementation 600 relating to example process 400 shown in FIG. 4. FIG. 6 shows an example of determining a location of a device using a server device 250 to coordinate between anchor devices, intermediate devices, and a target device.

As shown in FIG. 6, assume that example implementation 600 includes server device 250, a target device, intermediate devices A and B, and anchor devices A, B, C, and D. Assume further that anchor devices A, B, C, and D are within communication range of positioning system 240 and each possesses information identifying an anchor device location of a corresponding anchor device. As further shown in FIG. 6, assume that anchor devices A, B, and C are located outside of a building but within communication range of intermediate devices A and B, which are located inside of the building. As further shown in FIG. 6, assume that anchor device D is located outside of the building and within communication range of the target device. As further shown in FIG. 6, assume that intermediate devices A and B are within communication range of the target device, which is located inside of the building. As further shown in FIG. 6, assume that server device 250 is in communication with anchor devices A, B, C, and D, intermediate devices A and B, and the target device.

Assume that server device 250 receives an indication that anchor devices A, B, and C are within communication range of intermediate devices A and B. Server device 250 may receive information that identifies the anchor devices within communication range of intermediate devices A and B. Server device 250 may determine a confidence level associated with an anchor device location. As shown by reference number 610, assume that the confidence level of anchor device A's location is 88%, the confidence level of anchor device B's location is 88%, and the confidence level of anchor device C's location is 85%. Server device 250 may determine a location of intermediate devices A and B based on the anchor device locations of anchor device A, B, and C, and/or based on the confidence levels associated with the anchor device locations.

Assume further that server device 250 receives an indication that intermediate devices A and B are within communication range of the target device. Server device 250 may receive information that identifies the intermediate device locations of intermediate devices A and B. Server device 250 may determine a confidence level associated with an intermediate device location. As shown by reference number 620, assume that the confidence level of intermediate device A's location is 45% and the confidence level of intermediate device B's location is 57%. The confidence level of an intermediate device location is lower than the confidence level of an anchor device location because the intermediate device location is determined indirectly from information from positioning system 240.

Assume that server device 250 receives an indication that anchor device D is within communication range of the target device. Server device 250 may receive information identifying an anchor device location of anchor device D. Server device 250 may determine the confidence level associated with the anchor device location. As shown by reference number 630, assume that the confidence level of anchor device D's location is 91%.

As shown, server device 250 may determine the target device location based on the anchor device location of anchor device D and the intermediate device location of intermediate devices A and B, and/or based on the confidence levels associated with the anchor device location and the intermediate device locations. Server device 250 may provide information that identifies the target device location to the target device and/or store the information that identifies the target device location. As shown by reference number 640, assume that the confidence level associated with the target device location is 28%. The target device location and the confidence level associated with the target device location may be used to determine the location of other target devices and/or may be used in location based services in a number of contexts, such as a social networking context, a 911 emergency context, or a commercial context.

As indicated above, FIG. 6 is provided merely as an example. Other examples are possible and may differ from what was described with regard to FIG. 6.

Figure 7:
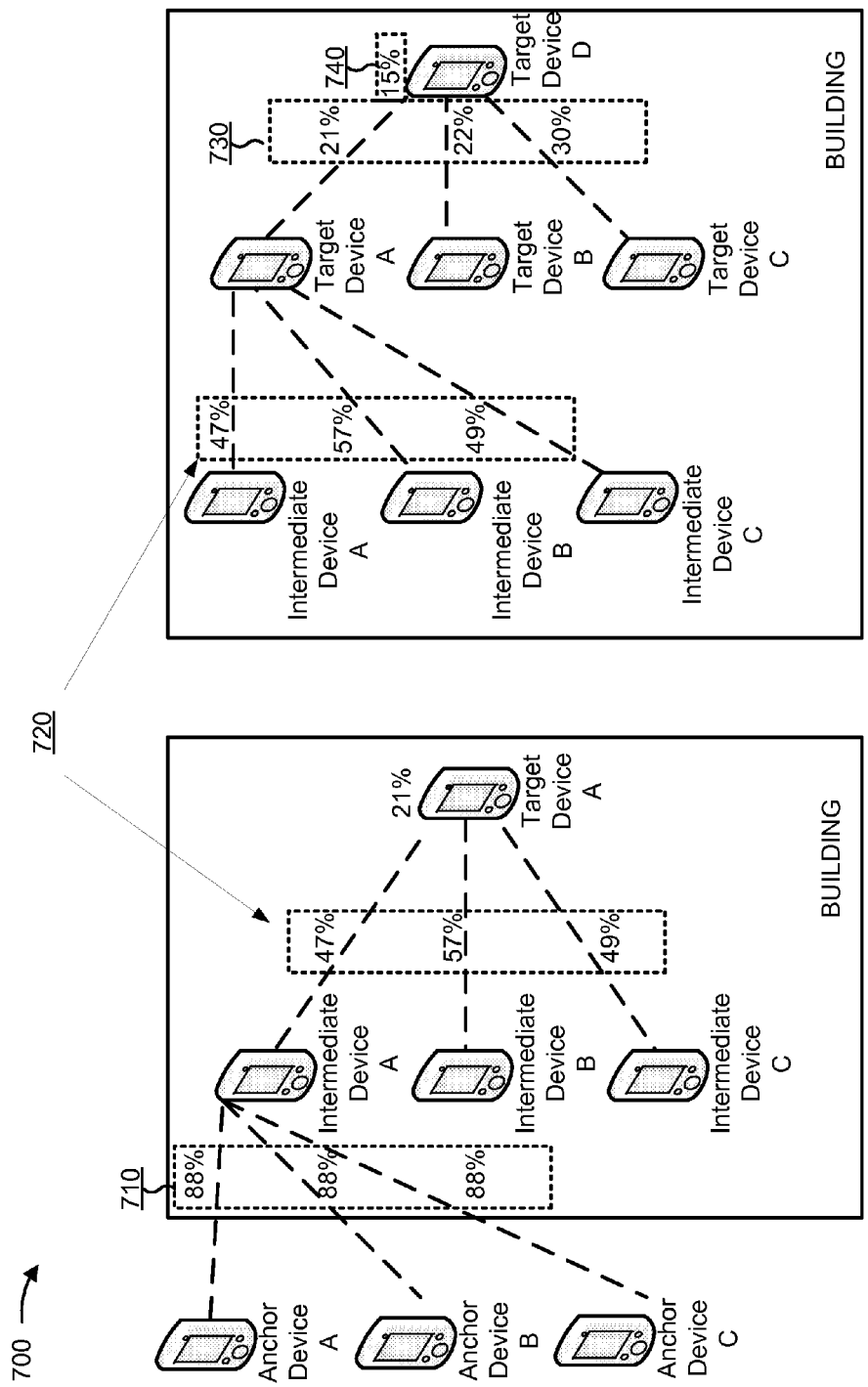

FIG. 7 is a diagram of an example implementation 700 relating to example process 400 shown in FIG. 4. FIG. 7 shows an example of determining a location of a target device using other target devices.

As shown in FIG. 7, assume that example implementation 700 includes anchor devices A, B, and C, intermediate devices A, B, and C, and target devices A, B, C, and D. Assume further that anchor devices A, B, and C are within communication range of positioning system 240 and each possess information that identifies anchor device locations corresponding to anchor devices A, B, and C. As further shown in FIG. 7, assume that anchor devices A, B, and C are located outside of a building and within communication range of intermediate devices A, B, and C, which are located inside of the building. As further shown in FIG. 7, assume that intermediate devices A, B, and C are within communication range of target devices A, B, and C, which are located further inside of the building. As further shown in FIG. 7, assume that target devices A, B, and C are within communication range of target device D, which is located still further inside of the building.

Assume that intermediate devices A, B, and C receive indications that anchor devices A, B, and C are within communication range. Intermediate devices A, B, and C may receive information that identifies the anchor device locations of the anchor devices within communication range. Intermediate devices A, B, and C may determine the confidence level associated with each anchor device location. As shown by reference number 710, assume that the confidence level of anchor device A's location is 88%, the confidence level of anchor device B's location is 88%, and the confidence level of anchor device C's location is 88%. Intermediate devices A, B, and C may each determine an intermediate device location based on the anchor device locations and/or based on the confidence level associated with each anchor device location.

Assume that target devices A, B, and C receive indications that intermediate devices A, B, and C are within communication range of target devices A, B, and C. Target devices A, B, and C may each receive information that identifies the intermediate device locations of intermediate devices A, B, and C. Target devices A, B, and C may determine the confidence level associated with each intermediate device location. As shown by reference number 720, assume that the confidence level of intermediate device A's location is 47%, the confidence level of intermediate device B's location is 57%, and the confidence level of intermediate device C's location is 49%. The confidence levels are lower than the confidence levels of the anchor device locations because information used to determine the intermediate device locations does not come directly from positioning system 240.

As shown, the target devices A, B, and C may each determine a target device location based on the intermediate device locations and/or based on the confidence level associated with the intermediate device locations. The target devices A, B, and C may provide and/or store the information that identifies the target device locations of target devices A, B, and C.

Assume further that target device D receives an indication that target devices A, B, and C are within communication range of target device D. Target device D may receive information that identifies the target device locations of target device A, B, and C. Target device D may determine the confidence level associated with each target device location. As shown by reference number 730, assume that the confidence level of target device A's location is 21%, the confidence level of target device B's location is 22%, and the confidence level of target device C's location is 30%.

As shown, target device D may determine a target device location of target device D based on the information that identifies the target device locations of target devices A, B, and C, and/or based on the confidence level associated with the target device locations. Target device D may provide and/or store the information that identifies the target device location of target device D. As shown by reference number 740, assume that the confidence level of target device D's location is 15%. The confidence level of target device D's location is lower than the confidence levels of target device A, B, and C's locations because target device D's location is based on other target devices and not on intermediate devices.

Target device D's location and the confidence level associated with target device D's location may be used to determine the location of other target devices and/or may be used in location based services in a number of contexts, such as a social networking context, an emergency context, or the like. For example, target device 230 may provide the confidence level to server device 250, and server device 250 may perform an action, associated with a location based service, based on the confidence level (e.g., may provide a service based on the confidence level, may provide a service in different manners based on different confidence levels, etc.).

As indicated above, FIG. 7 is provided merely as an example. Other examples are possible and may differ from what was described with regard to FIG. 7.

Implementations described herein may facilitate determining a location of a target device which is not within range of a positioning system, based on the locations of other devices within communication range of the target device, and/or based on the confidence levels associated with the locations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
 one or more processors to:

receive an indication that a first device, a second device, and a third device are within communication range of a target device,
  the first device being outside of communication range of a positioning system that provides information for determining a location,
  the target device being outside of communication range of the positioning system and outside of communication range of three or more devices which are within communication range of the positioning system,
  the second device and the third device being within communication range of the positioning system;
receive information that identifies:
  a first location associated with the first device,
    the first location being determined using locations of the three or more devices which are within communication range of the positioning system,
  a second location associated with the second device, the second location being determined using the positioning system, and
  a third location associated with the third device, the third location being determined using the positioning system;
determine a target device location of the target device based on the information that identifies the first location, the second location, and the third location;
identify a particular location based service of a plurality of location based services based on:
  a confidence level associated with the target device location, and
  a particular threshold of a plurality of thresholds,
    each location based service, of the plurality of location based services, being associated with a different threshold of the plurality of thresholds;
use information that identifies the target device location for the particular location based service; and
provide or store the information that identifies the target device location.

2. The device of claim 1, where the one or more processors, when determining the target device location, are to:
determine a first confidence level associated with the first location;
determine a second confidence level associated with the second location;
determine a third confidence level associated with the third location; and
determine the target device location further based on the first confidence level, the second confidence level, and the third confidence level.

3. The device of claim 1, where the device is a server device within communication range of the target device.

4. The device of claim 1, where the device is the target device.

5. The device of claim 1, where the one or more processors, when determining the target device location, are to:
determine a signal strength associated with a communication between the target device and at least one of:
  the first device, the second device, or the third device; and
determine the location of the target device further based on the signal strength.

6. The device of claim 1, where the one or more processors, when determining the target device location, are to:
determine a first relative position that indicates a relative position of the target device in relation to the first device;
determine a second relative position that indicates a relative position of the target device in relation to the second device;
determine a third relative position that indicates a relative position of the target device in relation to the third device; and
determine the target device location further based on the first relative position, the second relative position, and the third relative position.

7. The device of claim 1, where the one or more processors, when determining the target device location, are to:
determine the target device location based on triangulation of the first location, the second location, and the third location.

8. A computer-readable medium storing instructions, the instructions comprising:
one or more instructions that, when executed by one or more processors, cause the one or more processors to:
  receive an indication that a first device, a second device, and a third device are within communication range of a target device,
    the first device being associated with a first location determined indirectly using information from a positioning system,
    the target device being associated with a target device location that cannot be directly determined using information from the positioning system;
  receive information that identifies:
    the first location associated with the first device,
    a second location associated with the second device, the second location being determined using the positioning system, and
    a third location associated with the third device, the third location being determined using the positioning system,
    the first location being determined based on at least one of the
    second location or the third location;
  determine the target device location based on the first location, the second location, and the third location;
  use the target device location for a particular location based service of a plurality of location based services,
    the particular location based service being identified based on:
      a confidence level associated with the target device location, and
      a particular threshold of a plurality of thresholds, each location based service, of the plurality of location based services, being associated with a different threshold of the plurality of thresholds; and
  provide or store information that identifies the target device location.

9. The computer-readable medium of claim 8, where the one or more instructions, that cause the one or more processors to determine the target device location, cause the one or more processors to:
determine a first confidence level associated with the first location;
determine a second confidence level associated with the second location;
determine a third confidence level associated with the third location; and
determine the target device location further based on the first confidence level, the second confidence level, and the third confidence level.

10. The computer-readable medium of claim 9, where the first confidence level is based on a quantity of devices used to determine the first location.

11. The computer-readable medium of claim 9, where the first confidence level is based on an amount of time that has elapsed since a communication between the first device and the target device.

12. The computer-readable medium of claim 8, where the one or more instructions, when executed by the one or more processors, further cause the one or more processors to:
   synchronize communications associated with the first device, the second device, and the third device; and
   where the one or more instructions, that cause the one or more processors to receive the indication, cause the one or more processors to:
      receive the indication based on synchronizing the communications.

13. The computer-readable medium of claim 8, where the one or more instructions, that cause the one or more processors to receive the information that identifies the first location, the second location, and the third location, cause the one or more processors to:
   receive the information that identifies the first location, the second location, and the third location based on information received from the first device, the second device, and the third device.

14. The computer-readable medium of claim 8, where the one or more instructions, when executed by the one or more processors, further cause the one or more processors to:
   receive information that identifies a fourth location associated with a fourth device; and
   where the one or more instructions, that cause the one or more processors to determine the target device location, cause the one or more processors to:
      determine the target device location further based on the fourth location.

15. A method, comprising:
   receiving, by a device, information that identifies:
      a first location associated with a first device,
         the first device being outside of communication range of a positioning system that provides information for determining a location,
      a second location associated with a second device, and
      a third location associated with a third device,
         at least one of the second device or the third device being within communication range of the positioning system, and
         at least one of the second location or the third location being determined using the positioning system;
   determining, by the device, a target device location of a target device based on the information that identifies the first location, the second location, and the third location, the target device being outside of communication range of the positioning system and outside of communication range of three or more devices which are within communication range of the positioning system; and
   using, by the device, information that identifies the target device location for a particular location based service of a plurality of location based services
      the particular location based service being identified based on:
         a confidence level associated with the target device location, and
         a particular threshold of a plurality of thresholds,
            each location based service, of the plurality of location based services, being associated with a different threshold of the plurality of thresholds.

16. The method of claim 15, where determining the target device location comprises:
   receiving a first confidence level indicating a measure of accuracy of the first location;
   receiving a second confidence level indicating a measure of accuracy of the second location;
   receiving a third confidence level indicating a measure of accuracy of the third location; and
   determining the target device location further based on the first confidence level, the second confidence level, and the third confidence level.

17. The method of claim 16, where the first confidence level, the second confidence level, and the third confidence level change dynamically as the first location, the second location, and the third location change.

18. The method of claim 16, where the first confidence level, the second confidence level, and the third confidence level are based on a movement of the first device, the second device, or the third device.

19. The method of claim 15, where the device is a server device within communication range of the first device, the second device, the third device, or the target device.

20. The method of claim 15, where at least two of the first device, the second device, or the third device are not in communication with the positioning system.

* * * * *